(12) United States Patent
Wego et al.

(10) Patent No.: US 7,453,909 B2
(45) Date of Patent: Nov. 18, 2008

(54) METHOD FOR REDUCING THE BUS LOAD IN A SYNCHRONOUS DATA BUS SYSTEM

(75) Inventors: Arild Wego, Lier (NO); Pål Longva Hellum, Blommenholm (NO); Roar Malvig, Asker (NO)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 582 days.

(21) Appl. No.: 10/538,722

(22) PCT Filed: Dec. 27, 2002

(86) PCT No.: PCT/NO02/00497

§ 371 (c)(1),
(2), (4) Date: Jun. 13, 2005

(87) PCT Pub. No.: WO2004/059500

PCT Pub. Date: Jul. 15, 2004

(65) Prior Publication Data

US 2006/0075160 A1    Apr. 6, 2006

(51) Int. Cl.
*H04J 3/00* (2006.01)
(52) U.S. Cl. ......................... 370/498; 370/516
(58) Field of Classification Search ............ 370/498, 370/503, 516, 208, 376, 321, 347
See application file for complete search history.

(56) References Cited

U.S. PATENT DOCUMENTS

| | | | |
|---|---|---|---|
| 4,788,660 A | 11/1988 | Arizono | |
| 5,216,637 A | 6/1993 | Vaillancourt | |
| 5,758,131 A | 5/1998 | Taylor | |
| 5,862,131 A * | 1/1999 | Petty et al. | 370/362 |
| 5,940,384 A * | 8/1999 | Carney et al. | 370/347 |
| 5,946,327 A | 8/1999 | Murphy | |
| 6,119,190 A | 9/2000 | Garney | |
| 6,249,834 B1 | 6/2001 | Henderson et al. | |
| 6,362,974 B1 | 3/2002 | Lettang | |
| 6,370,386 B1 * | 4/2002 | Williams | 455/452.1 |
| 6,393,020 B1 * | 5/2002 | Patton | 370/362 |

FOREIGN PATENT DOCUMENTS

| | | |
|---|---|---|
| EP | 0 388 574 A | 9/1990 |
| EP | 0388574 | 9/1990 |

* cited by examiner

Primary Examiner—Chirag G Shah
Assistant Examiner—Minh-Trang Nguyen

(57) ABSTRACT

The present invention is related to buffering between synchronous circuits communication via a global synchronous bus, and in particular an arrangement for reducing the busload in a TDM bus system by, in a preferred embodiment, introducing a local TEM data bus and an active buffer including a CPU controlled logic between the transceiver loads and the TDM bus. The active buffers in the TX and RX direction together provides a time delay for data travelling from a first local TDM bus out on the backplane TDM bus and back to a second local TDM of the exact duration of one TDM frame or an integer number of TDM frames.

7 Claims, 4 Drawing Sheets

METHOD FOR REDUCING THE BUS LOAD IN A SYNCHRONOUS DATA BUS SYSTEM

FIELD OF THE INVENTION

The present invention is related to buffering between synchronous circuits communicating via a global synchronous bus in particular an arrangement for reducing the busload in a TDM bus system.

BACKGROUND OF THE INVENTION

Interconnecting synchronous circuits communicating on a common synchronous bus will in cases where more than one transceiver for each PCB is necessary involve the use of buffers to avoid signal degradation and ringing on the bus.

For example, the lower layer of communication networks like the connectivity layer in a core network of a cellular environment could be seen as a layer of distributed resources for managing data flows. Switches and multiplexers are some of the main components for this purpose. In complex communication networks managing data of different formats and varying data rates, it is of great importance to keep signal degradation and bit errors at a minimum.

Conventionally, the switches comprise a number of serial inputs and outputs. The data stream of one input may be directed in its entirety to a certain output line, or it may consist of a mixture of time division multiplexed data frames that are to be distributed to several outputs. The different lines may be running various interfaces e.g. E1, E2, E3 and STM-1.

The switching takes place on a TDM-bus system comprising a data bus (DATA) (usually 8 bits) and a data clock (TDM CLK). The time domain is divided into frames where each frame has a fixed duration (usually 125 μs), the start of each frame is indicated with a frame synchronization signal (FSYNC). The frames are divided into a fixed number of timeslots identified by local timeslot counters. In each timeslot, data may be transmitted from a transmitter to a receiver by using time division multiplexing (TDM).

Several transmitters and receivers are able to communicate with each other over the TDM bus when every local timeslot counter is synchronised to FSYNC. FIG. 1 shows how the BUS transceivers typically are connected to a backplane TDM bus. EN(1 . . . N) are timeslot enable signals enabling the timeslots out on the TDM bus.

The architecture indicated in the figure above, i.e. a is system with a large number of loads, may have problems related to degradation of received signals. The more loads a bus is subjected to, the more signal attenuation will occur.

Another drawback causing signal degradation as a result of two or more transceivers on one circuit board connected to the same TDM bus connector is the increase of stub lengths. The multi connection will cause longer stub lengths from the transceiver to the TDM bus because of the physical dimensions of the transceiver IC packages. Long stub lengths may lead to poor bus terminations that in turn may cause reflections and signal attenuation to occur, both of which may increase the bit error rate and retransmission frequency and reduce the data quality.

Another way of solving the busload problem is to have a tree structure of buffers, i.e. coupling together pairs of loads by passive buffers and, in the case of more than two loads, coupling the output of the buffers by additional buffers until only one load for connecting the TDM bus remains. However, this will introduce time delays that are not acceptable in most applications. Only delays that are multiples of whole frames are normally accepted for the total delay from the local TDM bus out on the backplane TDM bus and back on the local TDM bus.

SUMMARY OF THE INVENTION

It is an object of the present invention to provide an arrangement that eliminates the drawbacks described above. The features defined in the enclosed claims characterize this arrangement.

In particular, the present invention provides an arrangement in a circuit switched node with a back plane (global) Time Division Multiplex (TDM) data bus transferring data frames of time slots between one or more Printed Circuit Boards (PCB), each including a number of loads transferring data in both RX and TX direction. This arrangement includes at least a local TDM data bus in each PCB to which the associated number of loads are connected, and an intermediate CPU controlled logic in each direction connecting a local TDM data bus to the global TDM data bus, which logic includes a FIFO buffer through which time slots of data from the local or global TDM data bus is being written in and read out to the local or global TDM data bus introducing a phase difference providing a total delay for any time slot travelling from a local TDM bus to the global TDM data bus and back to a local TDM data bus being equal to the duration of an integer number of data frames.

BRIEF DESCRIPTION OF THE DRAWINGS

In order to make the invention more readily understandable, the discussion that follows refers to the accompanying drawings.

DESCRIPTION OF A PREFERRED EMBODIMENT OF THE PRESENT INVENTION

Figure 1:
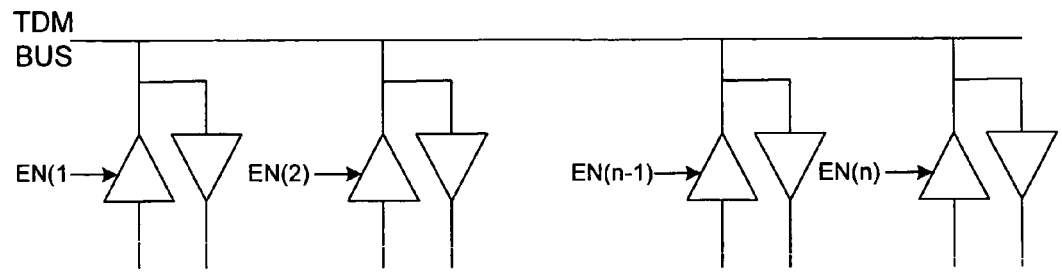
FIG. 1 illustrates a typical bus connection according to the state of the art.
Figure 2:
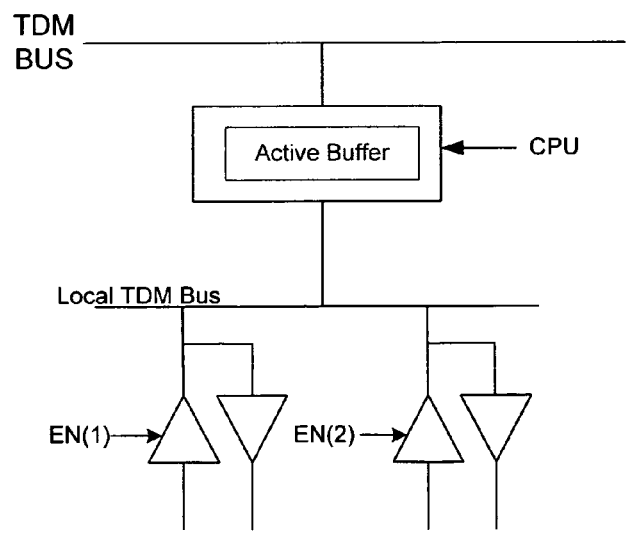
FIG. 2 is an overview of the bus connection according to one embodiment of the present invention.

The present invention provides an inventive arrangement generally solving the problems described above by introducing a local synchronous data bus (in the following referred to as a local TDM data bus) and an active buffer including a CPU controlled logic between the transceiver loads and the global synchronous data bus (in the following referred to as the global TDM data bus), as shown in FIG. 2. The active buffers in the TX and RX direction together provides a time delay for data travelling from a first local synchronous data bus out on the backplane synchronous data bus and back to a second local synchronous data bus of the duration of a controllable delay, in the preferred embodiment described in the following, the exact duration of one TDM frame or an integer number of TDM frames.

In the following, a preferred embodiment of the present invention is described. However, the present invention is not limited to this exemplification. Other variations and substitution may be implemented without departing from the scope of the invention as defined in the enclosed independent claim and the associated equivalents.

According to the invention, the active buffer comprises a separate digital hardware like an ASIC or a programmable logic like FPGA, CPLD, etc., localized between the local TDM bus on the PCB board and the TDM bus in the backplane. The present invention allows a reduction of total busload on the TDM-bus, since the number of transceivers connected to the bus will be reduced from two or more to one per PCB board. The present invention also allows a reduction of the stub lengths between the TDM bus transceivers and the bus because the distance between the transceiver and the bus connector will be shorter than in the case of two or more transceivers directly connected to the connector. The buffer should include bus transceivers (i.e. bus LVDS), which are compatible with the original transceivers. They must also contain memory (RAM) to store at least one frame of data and RX and TX tables, which store information on which timeslots that are used on the individual buses.

Figure 3:
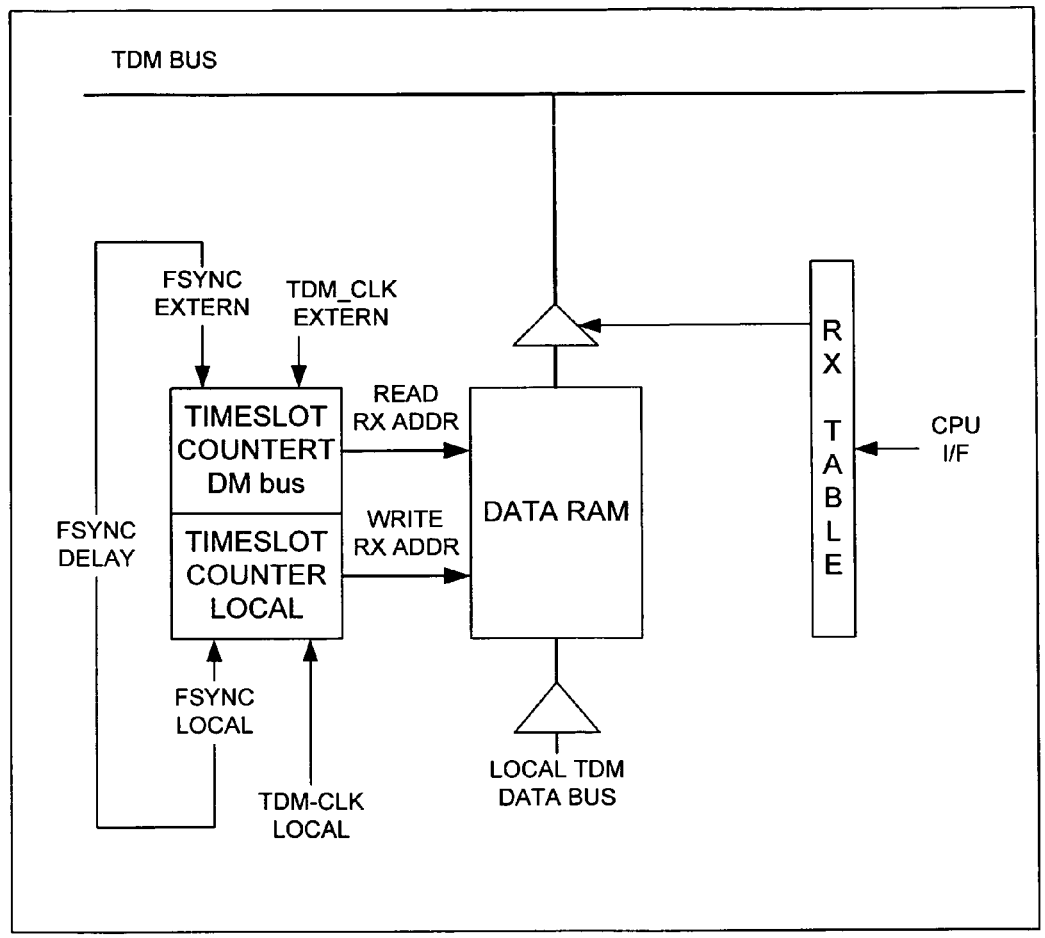
FIG. 3 shows the construction of the active buffer in the RX direction according to one embodiment of the present invention.
Figure 4:
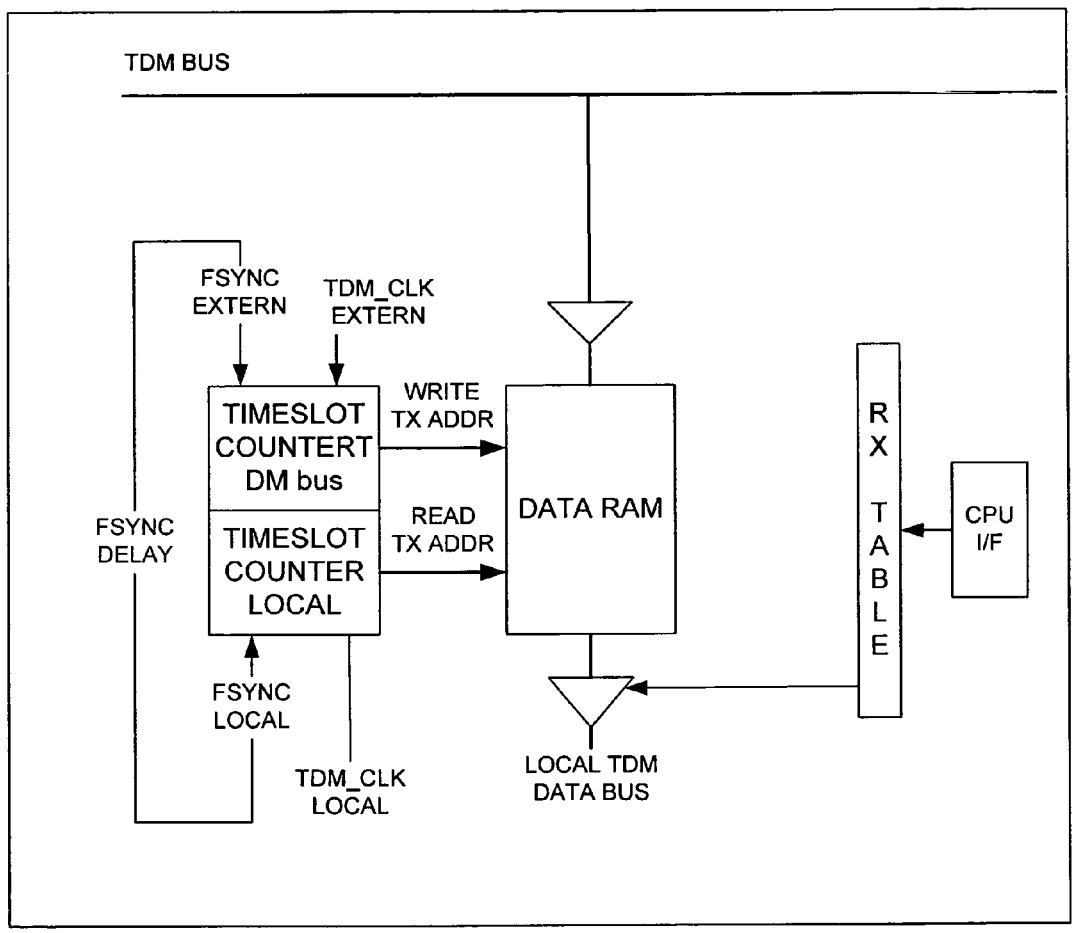
FIG. 4 shows the construction of the active buffer in the TX direction according to one embodiment of the present invention.

FIGS. 3 and 4 shows the structures of the active buffers in the RX and TX direction, respectively. In the following, a preferred active buffer in the RX direction will be described in further detail, but an equivalent description also applies to the active buffer as shown in FIG. 4, except from that the TX buffer is adapted for data flow in the opposite direction.

In addition to the data RAM, which preferably has the features of a FIFO, the active buffer includes an RX table, a "time slot counter TDM bus", a "time slot counter local bus", a write in and a read out buffer (to/from the data RAM). Data is clocked into the data RAM by the TDM_CLK LOCAL, which is the TDM clock of the local TDM bus, and clocked out from the RAM with the TDM_CLK EXTERN, which is the TDM clock of the back plane TDM bus controlled by a system master circuit. The time slot counters have FSYNC EXTERNAL, TDM_CLK EXTERNAL and FSYNC LOCAL, TDM_CLK LOCAL as inputs, respectively. The time slot counters are initialised on the corresponding FSYNCs signal, using the same frequency as their corresponding TDM_CLKs, and keep track of which timeslot that is present on the bus. The outputs from these counters (READ RX ADDR and WRITE RX ADDR) are used to address the data RAM, i.e. READ RX ADDR points at the location in the RAM in which the time slot that possibly is to be read out on the back plane TDM bus is localised, and WRITE RX ADDR points at the location in the RAM in which the time slot that possibly is to be written in the data RAM should be localised. Further, TDM_CLK EXTERN and TDM_CLK LOCAL (as well as for FSYNC EXTERN and FSYNC LOCAL) should have the same frequency, but the phase difference should be adjusted to provide the preferred delay from the local TDM bus to the back plane TDM bus. In fact, the difference between READ RX ADDR and WRITE RX ADDR, which in turn is controlled by the TDM_CLKs and FSYNCs through the time slot counters, represents the actual delay in terms of time slots through the active buffer. TDM_CLK LOCAL and FSYNC LOCAL are preferably derived from TDM_CLK EXTERN and FSYNC EXTERN, respectively, but it should also be possible to derive TDM_CLK EXTERN and FSYNC EXTERN from TDM_CLK LOCAL and FSYNC LOCAL, respectively.

The content of the RX table is centrally controlled by the CPU of the system concerned. One bit per time slot is assign to each time slot localisation in the data RAM. A "1" enables reading of the data at which READ RX ADDR currently is pointing from the read out buffer, and a "0" disables the read out buffer. Note that the data RAM locations corresponding to the back plane time slots not being used by the load connected to the local TDM bus do not include significant data, and the associated RX table bits are "0".

Figure 5:
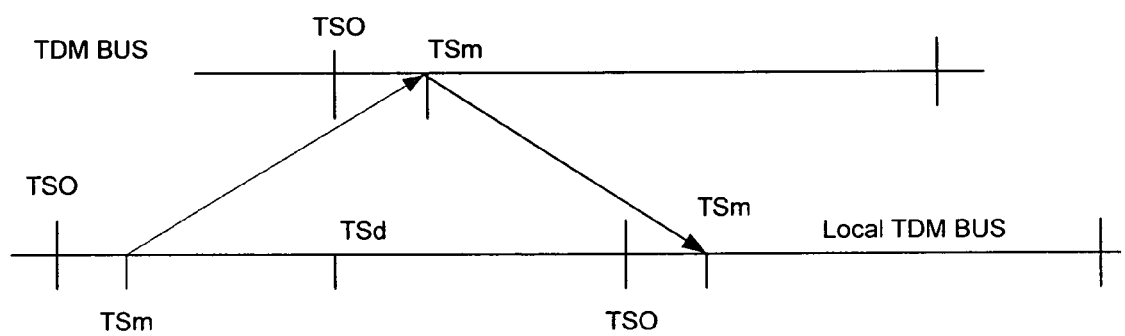
FIG. 5 shows the delay between the TDM bus and the local TDM bus when using a preferred embodiment of the present invention.

As previously indicated, the phase relationship between the local and back plane TDM bus timeslots must be in such a manner that the delay from the local TDM bus to the backplane TDM bus(RX) plus the delay from the TDM bus to the local TDM bus(TX) is exactly the duration of one frame or an integer number of frames. Furthermore, the delay (d) between the busses must be an integer number timeslots. This is illustrated in FIG. 5, and is made possible by the controllable RAM implementation described above. The TSd indicates the phase shift in number of TS between the local and backplane bus. The number m indicates the delay for a random timeslot transmitted from the local TDM bus out on the backplane TDM bus and back on the local TDM bus again.

The present invention may advantageously be implemented in telecom switches like Base Station Controllers (BSC's) Radio Node Controllers (RNC's) or any other switches of specially purposed cellular networks or generally purposed data communication networks. The invention may be utilised connecting STM-1 PCB boards to a TDM bus using only one load per STM-1 board instead of two, so that the total load on the bus could be halved.

One of the main advantages of the present invention is that the busload is reduced, leading to smaller signal attenuation across the TDM bus.

Additionally, the stub lengths may be shortened since only one instead of e.g. two transceivers is connected to each bus connector. This means improved terminations and less signal reflection and attenuation.

Furthermore, although an additional buffer step is introduced due to the intelligent feature of the buffer, no combinatorial delays are introduced, only synchronous delays that are multiples of whole frames.

The present invention also provides simplified PCB routing in terms of simplified wiring and shorter stub lengths.

ABBREVIATIONS

PCB Printed Circuit Board
RX Receive direction (from local TDM bus to backplane TDM bus)
TX Transmit direction (from backplane TDM bus to local TDM bus)
FPGA Field Programmable Gate Array
ASIC Application Specific Integratet Circuit
TDM Time Division Multiplex

The invention claimed is:

1. An arrangement for interconnection of two or more printed circuit boards communicating with each other over a time division multiplex data bus, each circuit board including a number of loads transferring data in both a receive and transmit direction, comprising:

a local time division multiplex data bus in each printed circuit board to which the associated number of loads are connected, an intermediate Central Processing Unit controlled logic in each direction connecting each local time division multiplex data bus to a global time division multiplex data bus, which is a back plane time division multiplex data bus, said arrangement being implemented in a circuit switched node, and said control logic including:

a First-In-First-Out buffer through which synchronous data from the respective local time division multiplex data bus or the global time division multiplex data bus is being written in and read out to the respective local time division multiplex data bus or the global time division multiplex data bus introducing a phase difference, providing a total delay for any data traveling from the respective local time division multiplex data bus to the global time division multiplex data bus and back to the respective local time division multiplex data bus, being of a controllable dimension equal to an integer number of data frames; and a first and a second time slot counter, the first counter addressing a first data location in the First-In-First-Out buffer into which, in case of receive direction, time slot data from a local time division multiplex data bus is to be written, or out of which, in case of transmit direction, time slot data to a local time division multiplex bus is to be read, the second counter addressing a second data location in the First-In-First-Out buffer into which, in case of transmit direction, time slot data from the global time division multiplex bus is to be written, or out of which, in case of receive direction, time slot data to the global time division multiplex bus is to be read, wherein the phase difference between the first and the second time slot counter represents a preferred part of said total delay caused by the logic of the respective direction.

2. The arrangement as defined in claim 1, wherein the first counter is incremented by a first clock corresponding to the current local time division multiplex data bus and initialised by a first frame synchronisation signal indicating the start of each frame in the current local time division multiplex data bus, the second counter is incremented by a second clock corresponding to the global time division multiplex data bus and initialised by a second frame synchronisation signal indicating the start of each frame in the global time division multiplex data bus.

3. The arrangement as defined in claim 2, wherein the first clock and frame synchronisation signal is derived from the second clock and frame synchronisation signal, adapted to provide said preferred part of said total delay caused by the logic of the respective direction.

4. The arrangement as defined in claim 1, wherein the logic further includes a table including one bit per data location in the First-In-First-Out buffer, wherein, in case of transmit direction, if a first logic value is assigned to the data location addressed by the first counter, reading of the content in that data location to the certain local time division multiplex data bus is enabled, in contrast to a second logic value in which case reading is disabled, and in case of receive direction, if a first logic value is assigned to the data location addressed by the second counter. reading of the content in that data location to the global time division multiplex data bus is enabled, in contrast to a second logic value in which case reading is disabled.

5. The arrangement as defined in claim 1, wherein the preferred part of said total delay caused by the logic of the receive direction is the duration of one frame minus the preferred part of said total delay caused by the logic of the transmit direction.

6. The arrangement as defined in claim 5, wherein the preferred part of said total delay caused by the logic of the transmit direction is the duration of 8 or 16 time slots.

7. The arrangement as defined in claim 1, wherein the circuit switched node is a Base Station Controller or a switch in any circuit switched enabled data or telecommunication network.

* * * * *

UNITED STATES PATENT AND TRADEMARK OFFICE
CERTIFICATE OF CORRECTION

PATENT NO. : 7,453,909 B2 Page 1 of 2
APPLICATION NO. : 10/538722
DATED : November 18, 2008
INVENTOR(S) : Wego et al.

It is certified that error appears in the above-identified patent and that said Letters Patent is hereby corrected as shown below:

On the Face Page, in Figure, delete "TIMESLOT COUNTERT DM bus" and insert -- TIMESLOT COUNTER TDM bus --, therefor.

On the Face Page, in Figure, delete "TIMESLOT COUNTER LOCAL" and insert -- TIMESLOT COUNTER LOCAL bus --, therefor.

In Fig. 3, Sheet 2 of 4, delete "TIMESLOT COUNTERT DM bus" and insert -- TIMESLOT COUNTER TDM bus --, therefor.

In Fig. 3, Sheet 2 of 4, delete "TIMESLOT COUNTER LOCAL" and insert -- TIMESLOT COUNTER LOCAL bus --, therefor.

In Fig. 4, Sheet 3 of 4, delete "TIMESLOT COUNTERT DM bus" and insert -- TIMESLOT COUNTER TDM bus --, therefor.

In Fig. 4, Sheet 3 of 4, delete "TIMESLOT COUNTER LOCAL" and insert -- TIMESLOT COUNTER LOCAL bus --, therefor.

In Fig. 5, Sheet 4 of 4, delete "TSO" and insert -- TS0 --, therefor at each occurrence in Fig. 5.

In Column 1, Line 47, after "i.e. a" delete "is".

UNITED STATES PATENT AND TRADEMARK OFFICE
CERTIFICATE OF CORRECTION

PATENT NO. : 7,453,909 B2
APPLICATION NO. : 10/538722
DATED : November 18, 2008
INVENTOR(S) : Wego et al.

It is certified that error appears in the above-identified patent and that said Letters Patent is hereby corrected as shown below:

In Column 6, Line 16, in Claim 4, delete "counter." and insert -- counter, --, therefor.

Signed and Sealed this

Seventh Day of July, 2009

JOHN DOLL
*Acting Director of the United States Patent and Trademark Office*